United States Patent
Adachi et al.

(10) Patent No.: US 8,261,287 B2
(45) Date of Patent: *Sep. 4, 2012

(54) ACTIVITY MONITORING WITHOUT ACCESSING A PROCESS OBJECT

(75) Inventors: Hisatoshi Adachi, Komae (JP); Sari Shimizu, Kanagawa-ken (JP); Yohsuke Tanaka, Kanagawa-ken (JP); Yoshihiro Osaka, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1089 days.

This patent is subject to a terminal disclaimer.

(21) Appl. No.: 12/171,609

(22) Filed: Jul. 11, 2008

(65) Prior Publication Data

US 2009/0007142 A1      Jan. 1, 2009

Related U.S. Application Data

(63) Continuation of application No. 10/988,255, filed on Nov. 12, 2004, now Pat. No. 7,441,249.

(30) Foreign Application Priority Data

Nov. 13, 2003   (JP) .................................. 2003-383646

(51) Int. Cl.
*G06F 9/46* (2006.01)
*G06F 17/50* (2006.01)
*G06F 15/16* (2006.01)

(52) U.S. Cl. ............. 719/316; 719/313; 703/1; 709/201

(58) Field of Classification Search .......................... None
See application file for complete search history.

(56) References Cited

U.S. PATENT DOCUMENTS

| 5,960,404 A | 9/1999 | Chaar et al. |
| 6,845,507 B2 | 1/2005 | Kenton |

(Continued)

FOREIGN PATENT DOCUMENTS

JP   2001-092647   4/2001

(Continued)

OTHER PUBLICATIONS

Leymann et al., "Web services and business process management", IBM Systems Journal vol. 41, No. 2, 2002, pp. 198-211.

*Primary Examiner* — Andy Ho
*Assistant Examiner* — Tuan Dao
(74) *Attorney, Agent, or Firm* — Roy W. Truelson

(57) ABSTRACT

Disclosed is a method, apparatus, and program product that allows for monitoring of the progress of process without alterations to the existing application. There are provided a mapping logic generating unit 14 that refers to a mapping definition stored in a mapping definition storage unit 11 for mapping an object flow event to a control flow event, generates a mapping logic for identifying a control flow event mapped to an object flow event, and stores the mapping logic in a mapping logic storage unit 16; a log logic generator unit 15 that refers to a process definition stored in a process definition storage unit 12 for mapping a control flow event to monitoring log information, generates a log logic for providing a monitoring log of control flow events, and stores the log logic in a log logic storage unit 17; and a logic skeleton composer unit 18 that embeds a mapping logic and a log logic into a skeleton stored in a skeleton storage unit 13.

11 Claims, 9 Drawing Sheets

U.S. PATENT DOCUMENTS

| | | |
|---|---|---|
| 7,181,493 B2 | 2/2007 | English et al. |
| 7,275,039 B2 | 9/2007 | Setteducati |
| 7,363,628 B2 | 4/2008 | Shukla et al. |
| 2001/0044738 A1 | 11/2001 | Elkin et al. |
| 2002/0026535 A1* | 2/2002 | Srinivasan .................... 709/320 |
| 2002/0032544 A1 | 3/2002 | Reid et al. |
| 2002/0109170 A1 | 8/2002 | Tang et al. |
| 2002/0120484 A1 | 8/2002 | Bantz et al. |
| 2002/0120711 A1 | 8/2002 | Bantz et al. |
| 2002/0133328 A1* | 9/2002 | Bowman-Amuah ............ 703/22 |
| 2003/0016806 A1 | 1/2003 | Emerson |
| 2004/0064351 A1 | 4/2004 | Mikurak |
| 2004/0107125 A1 | 6/2004 | Guheen et al. |
| 2005/0216555 A1* | 9/2005 | English et al. ................ 709/204 |

FOREIGN PATENT DOCUMENTS

| | | |
|---|---|---|
| JP | 2002-132503 | 5/2002 |
| JP | 2002-259640 | 9/2002 |
| JP | 2002-324155 | 11/2002 |

* cited by examiner

Figure 4

| Actually exchanged message | Process event |
|---|---|
| Message 1 = Process event indicator 1 in process A | |
| Message 2 = Process event indicator 2 in process A | |
| Message 3 = Process event indicator 3 in process A | |
| . | . |
| . | . |
| . | . |

ACTIVITY MONITORING WITHOUT ACCESSING A PROCESS OBJECT

CROSS REFERENCE TO RELATED APPLICATION

This is a continuation of pending U.S. patent application Ser. No. 10/988,255, filed Nov. 12, 2004, entitled "Activity Monitoring Without Accessing a Process Object", which is herein incorporated by reference. This application claims priority under 35 U.S.C. §120 of U.S. patent application Ser. No. 10/988,255, filed Nov. 12, 2004, and also claims priority under 35 U.S.C. §119 of Japanese Application 2003-383646, filed Nov. 13, 2003.

FIELD OF THE INVENTION

The present invention relates to an event information converting apparatus for converting information about an event in an information flow produced by executing a process that is a workflow (hereinafter referred to as an "object flow event") into information about an event in the workflow (hereinafter referred to as a "control flow event").

BACKGROUND OF THE INVENTION

Attention has recently been given to Business Process Integration (BPI), which combines existing application programs (hereinafter referred to as "applications") that were operating separately in the same company. Business Process Integration may be defined as an approach to integration that, beyond application integration such as real-time information synchronization and sharing, invokes required internal and external applications or services on the basis of the entire workflow of a business process.

A system resulting from such business process integration can be considered as a chain of job units (activities) to be performed by individuals or a computer. A problem lies in how to monitor the progress of work to check which activity is handling a particular job. This problem is addressed by a Business Activity Monitor (BAM). A Business Activity Monitor visualizes business processes and IT events concerning business operations in order to facilitate early detection of a problem, performance analysis, and improvement and optimization of a business operation.

However, some existing applications (legacy applications) contain processes (implicit processes) that are not managed by a workflow system. In order to manage processes by the workflow system in such an application, the application must be modified to suit the workflow system. For many legacy applications, however, it is difficult to add new functions. In real system integration cases, it is often demanded that legacy systems be integrated and transaction logs in those legacy systems be integrated and displayed without having to modifying the legacy systems.

SUMMARY OF THE INVENTION

The present invention solves these problems by providing the ability to monitor the progress of implicit processes without modifying existing applications.

The present invention focuses on activities that exchange information with tasks in external systems or in internal systems interconnected through a network. According to the present invention, an event that occurs in relation to a task is received and converted into an event in a progress model of a business process, without modifying existing legacy systems.

In particular, the event information converting apparatus of the present invention includes: object-flow-event-information-obtaining means for obtaining information about an object flow event that is an event in a flow of information generated by performing a process that is a workflow; and control-flow-event-identifying means for identifying a control flow event relating to the object flow event about which information is obtained by the object-flow-event-information-obtaining means, from among control flow events that are events in the workflow.

Furthermore, by converting an event that occurs in relation to a task into an event in a progress model of a business process in this way, an implicit business process in a legacy system is monitored. In particular, the event information converting apparatus of the present invention may further comprise control-flow-event-information logging means for recording information about a control-flow-event identified by control-flow-event-identifying means.

The present invention may also be viewed as a message exchanging apparatus that converts an event that occurs in relation to a task into an event in a progress model of a business process. In this case, the message exchanging apparatus of the present invention includes: message detecting means for detecting a message exchanged between a process that is a workflow and an external task; and a control-flow-event-identifying means for identifying a control flow event relating to the message detected by the message detecting means, from among control flow events that are events in the workflow.

The present invention may also be viewed as an event information converting program generating apparatus that generates an event information converting program (event converter) for converting an event that occurs in relation to a task into an event in a progress model of a business process. In this case, the event information converting program generating apparatus of the present invention includes: mapping definition storage means for storing a mapping definition that associates an object flow event that is an event in a flow of information generated by performing a process that is a workflow with a control flow event that is an event in the workflow; and mapping logic generating means for generating a mapping logic with reference to the mapping definition stored in the mapping definition storage means to obtain information about the object flow event and identifying the control flow event mapped to the object flow event.

The present invention may also be viewed as an event information converting method for converting an event that occurs in relation to a task into an event in a progress model of a business process. In this case, the event information converting method of the present invention includes the steps of: storing a mapping definition that associates an object flow event that is an event in a flow of information generated by performing a process that is a workflow with a control flow event that is an event in the workflow; obtaining information about the object flow event; and identifying the control flow event mapped to the object flow event about which information is obtained by referring to the stored mapping definitions.

Furthermore, the present invention may be viewed as a method for generating an event information converting program (event converter). In this case, the event information converting program generating method of the present invention includes the steps of: storing a mapping definition that associates an object flow event that is an event in a flow of information generated by performing a process that is a workflow with a control flow event that is an event in the workflow; and generating a mapping logic with reference to the stored mapping definition to obtain information about the object flow event and identifying the control flow event mapped to the object flow event.

The present invention may also be viewed as a computer program for causing a computer to implement functions of an event information converting apparatus. In this case, the program of the present invention causes a computer to implement the functions of: obtaining information about an object flow event that is an event in a flow of information generated by performing a process that is a workflow; identifying, from among control flow events that are events in the workflow, a control flow event relating to the object flow event about which information is obtained.

The present invention may also be viewed as a computer program for causing a computer to implement functions of an event information converting program generating apparatus. In this case, the program of the present invention causes a computer to implement the functions of: reading a mapping definition that associates an object flow event that is an event in a flow of information generated by performing a process that is a workflow with a control flow event that is an event in the workflow; and generating a mapping logic with reference to the read mapping definition to obtain information about the object flow event and identifying the control flow event mapped to the object flow event.

The present invention may also be viewed as a method applied to the business process integration system which is equipped with a first and a second information processing systems and a message switching system, exchanges messages between the first and the second information processing systems through the message switching system, and performs a certain business process; the method comprising the step of: judging the progress of the business process based on the message exchanged.

The present invention may also be viewed as a conversing apparatus applied to the business process integration system which is equipped with the first and the second information processing systems and a message switching system, exchanges messages between the first and the second information processing systems through the message switching system, and performs a certain business process; the conversing apparatus comprising of: a judging part for judging the progress of the business process based on the message exchanged.

The present invention may also be viewed as a program for a computer to be operated as a conversing apparatus applied to the business process integration system which is equipped with the first and the second information processing systems and a message switching system, exchanges messages between the first and the second information processing systems through the message switching system, and performs a certain business process; the program for causing the computer to implement the function of: judging the progress of the business process based on the message exchanged.

The present invention may also be viewed as a solution providing method applied to the business process integrating system which is equipped with the first and second information-processing systems and a message-switching system, exchanges messages between the first concerned and second information-processing systems through the message-switching system concerned, and performs a certain business process; the method comprising the step of: analyzing the relation of the message exchanged and the progress of the business process.

According to the present invention, the progress of an implicit process can be monitored without having to modify existing applications.

BRIEF DESCRIPTION OF THE DRAWINGS

FIG. 4 is a diagram for illustrating a mapping definition used in the present embodiment;

DESCRIPTION OF THE PREFERRED EMBODIMENT

Figure 1:
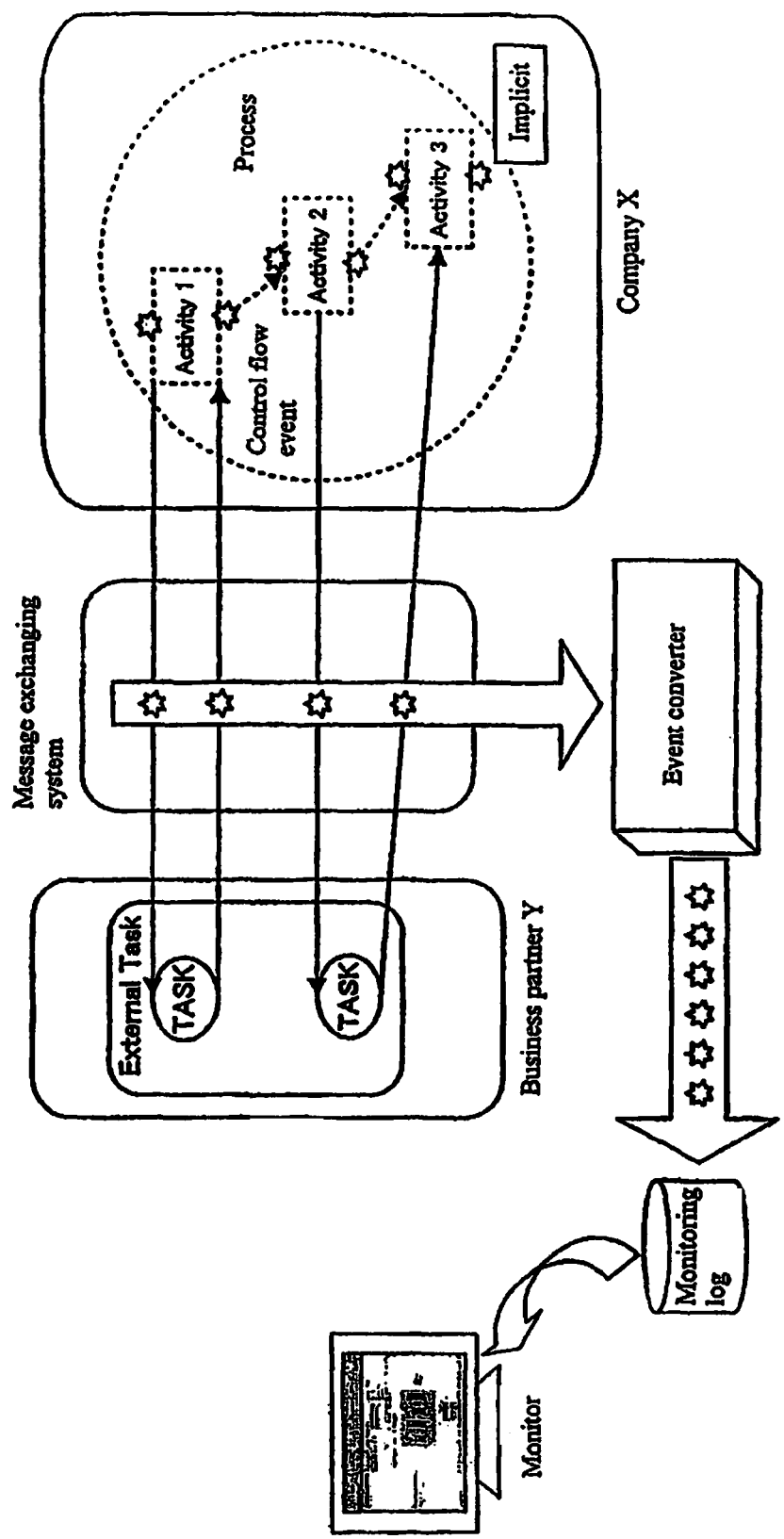
FIG. 1 is a conceptual diagram for illustrating an event converter according to the present embodiment.

The following symbols are used in herein:
10 . . . Event converter generating apparatus
11 . . . Mapping definition storage
12 . . . Process definition storage
13 . . . Skeleton storage
14 . . . Mapping logic generator
15 . . . Log logic generator
16 . . . Mapping logic storage
17 . . . Log logic storage
18 . . . Logic skeleton composer
19 . . . Source code storage
20a . . . Message exchanging apparatus
20b . . . Event information exchanging apparatus
21a . . . Message detecting unit
21b . . . Object flow event information obtaining unit
22a, 22b . . . Control flow event identifying unit
23a, 23b . . . Control flow event information log unit An embodiment of the present invention will be described in detail below with reference to the accompanying drawings.

FIG. 1 shows an exemplary configuration of a system to which the present embodiment is applied.

As shown in FIG. 1, the present embodiment may be applied to a case where messages are exchanged between an activity performed in a process at company X and an external task running on business partner Y, for example, through a message exchanging system. The process performed at company X is an implicit process that is not managed by a workflow system. Activities in the process may be subsystem-level job units such as purchase, production, and delivery jobs, for example, at company X, or may be sublevel job units in such a subsystem. Activities may be job units executed by a computer or those performed by people. In the former case, one activity in a process may be performed by one computer or more than one activities in a process may be performed by one computer.

In the present embodiment, an event information converting program (hereinafter referred to as an "event converter") is running for converting information about an object flow event that is an event in a flow of information generated by performing a process into information about a control flow event that is an event in a business flow. In particular, information about exchanges of messages between activities at company X and external tasks at business partner Y is obtained as object flow event information and information about the start and/or end of each activity is generated as control flow event information in the present embodiment. The event converter records the generated information as a monitoring log that can be displayed on a monitor screen. Exchanges of messages herein may be considered as inter-process communication or cable or wireless communication between computers if the activities at company X and the external tasks at business partner Y are implemented by computer. On the other hand, if the activities at company X and the external tasks at business partner Y are implemented as human jobs, the exchanges of messages may be considered as exchanges of documents or electronic mail messages between company X and business partner Y.

A configuration of a system for automatically generating the above-described event converter will be described below.

Figure 2:
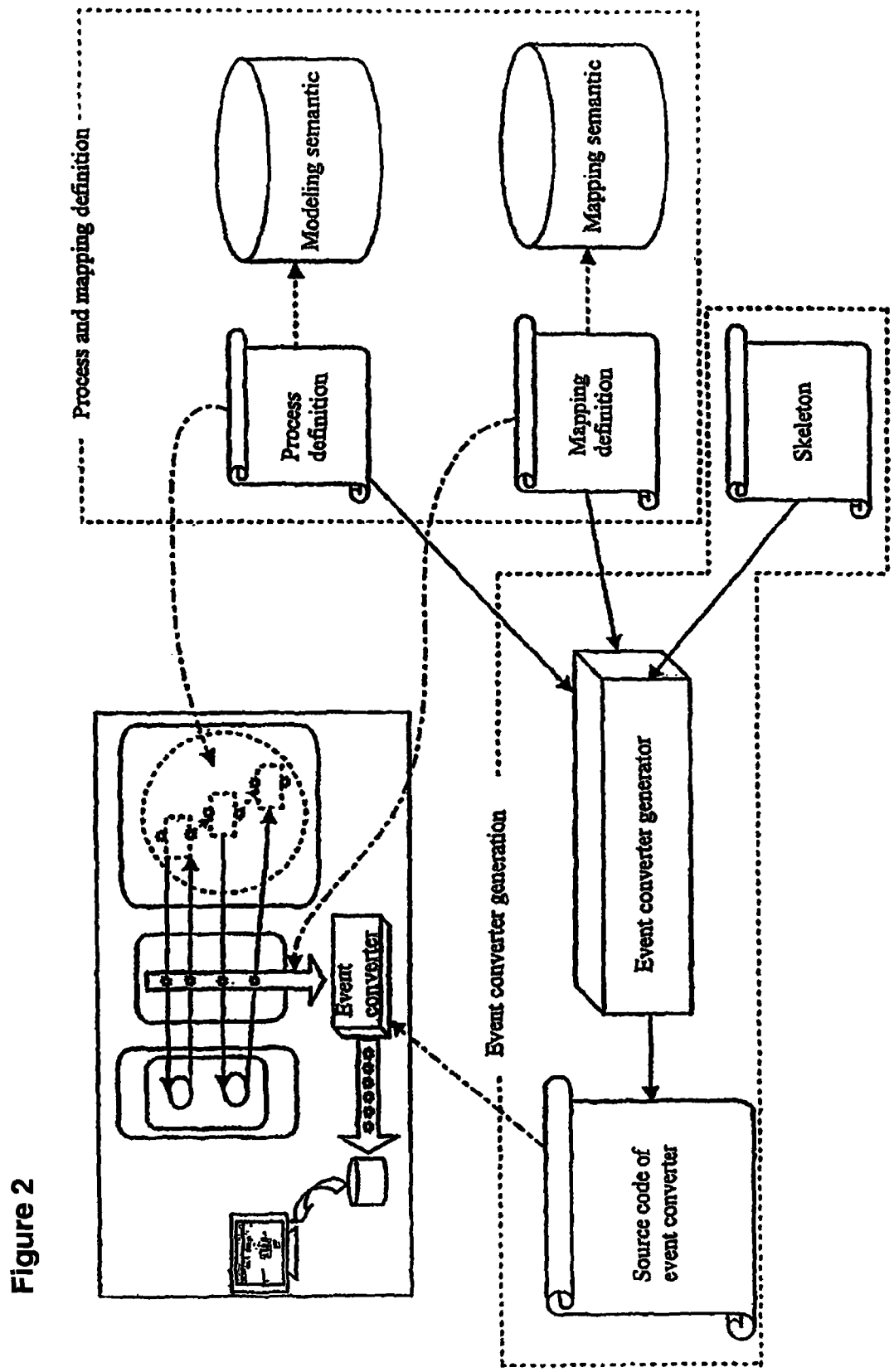
FIG. 2 is a conceptual diagram for illustrating an event converter generator according to the present embodiment.

As shown in FIG. 2, a source code from which the event converter is produced is generated by an event converter generating program (hereinafter referred to as the "event converter generator") on the basis of a mapping definition described according to mapping semantics, a process definition described according to modeling semantics, and a skeleton describing implementation-dependent portions for causing the event converter to be executed on a particular message exchanging system.

The mapping semantics and modeling semantics specify rules for describing mapping definitions and process definitions, respectively. For example, the developer of a system at company X can describe definitions according to the semantics to allow the event converter generator to generate an event converter. The dashed-line arrow from the process definition to the modeling semantics and the dashed-line arrow from the mapping definition to the mapping semantics indicate that these definitions are dependent on the semantics.

An event converter generating apparatus 10 which includes the components enclosed in the dashed lines labeled with "Event converter generation" and "Process and mapping definition" in FIG. 2 will be detailed below.

Figure 3:
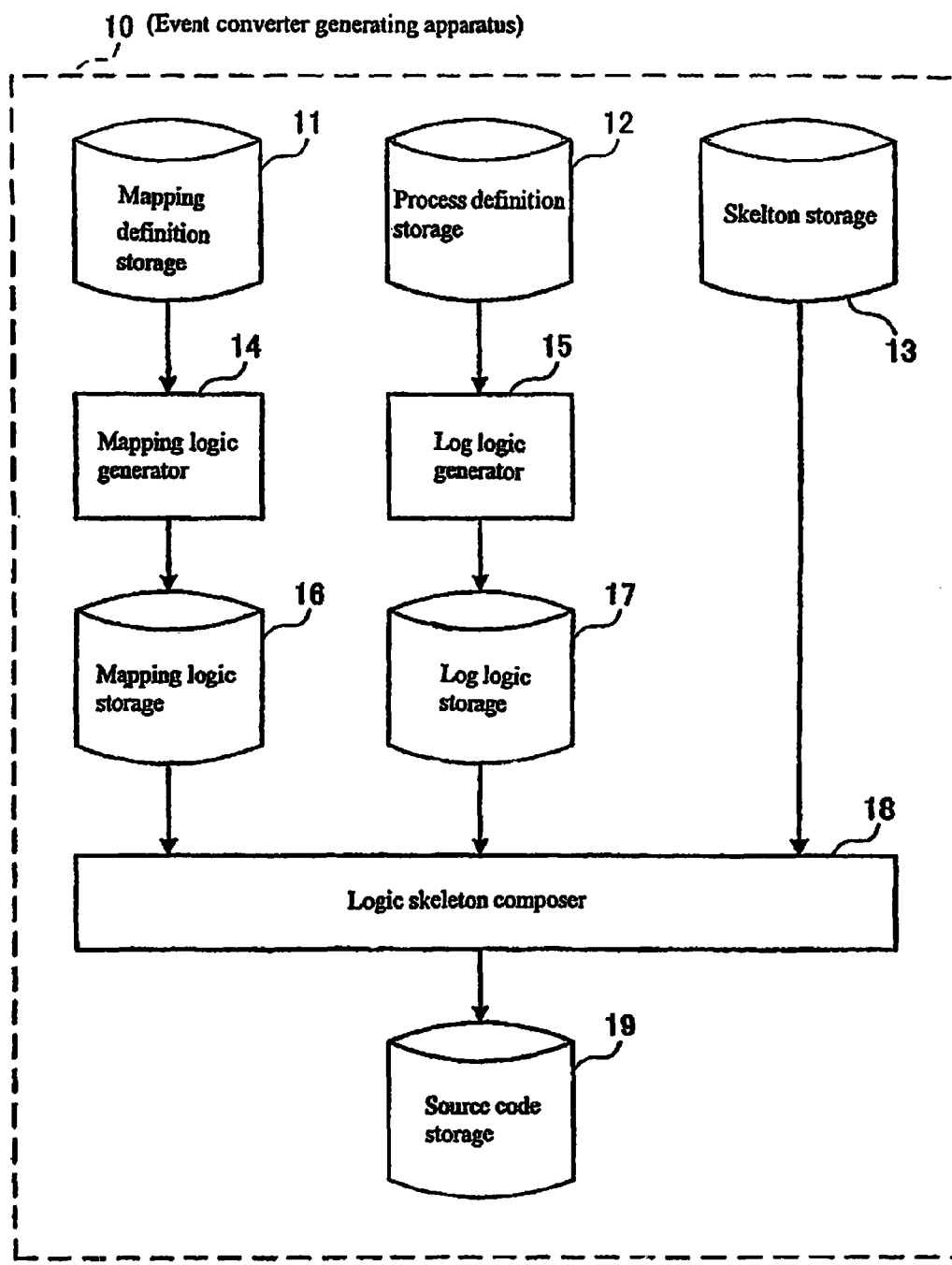
FIG. 3 is a diagram for illustrating an event converter generation apparatus in the present embodiment.

As shown in FIG. 3, the event converter generating apparatus 10 includes a mapping definition storage 11, a process definition storage 12, a skeleton storage 13, a mapping logic generator 14, a log logic generator 15, a mapping logic storage 16, a log logic storage 17, a logic skeleton composer 18, and a source code storage 19.

The mapping definition storage 11 stores a mapping definition that associates an object flow event with a control flow event. For example, it stores the relation of a message exchanged between a process and an external task with a process event indicator, which is an indicator uniquely assigned to a control flow event in the process.

The process definition storage 12 stores a process definition that associates a control flow event with information recorded as a monitoring log of that control flow event. For example, it stores information indicating which process event indicator is associated with which status of which activity.

The skeleton storage 13 stores a skeleton describing implementation-dependent portions that causes the event convert to be executed on a particular message exchanging system.

The mapping logic generator 14 reads a mapping definition stored in the mapping definition storage 11 and generates a processing logic (mapping logic) for identifying a control flow event based on information about an object flow event. For example, it generates a mapping logic for identifying a relevant process event indicator based on a detected message.

The log logic generator 15 reads a process definition stored in the process definition storage 12 and generates a processing logic portion (log logic) that outputs information about a control flow event identified by a mapping logic, as a monitoring log. For example, it generates a log logic that identifies the type of a log corresponding to a process event indicator and outputs the log.

The mapping logic storage 16 stores a mapping logic generated by the mapping logic generator 14.

The log logic storage 17 stores a log logic generated by the log logic generator 15.

The logic skeleton composer 18 applies a mapping logic stored in the mapping logic storage 16 and a log logic stored in the log logic storage 17 to a skeleton stored in the skeleton storage 13 to generate a source code of the event converter.

The source code storage 19 stores a source code generated by the logic skeleton composer 18.

A typical computer system hardware configuration may be used as the hardware configuration of the event converter generating apparatus 10 in the present embodiment. That is, the event converter generating apparatus 10 may include a central processing unit (CPU) and a main memory, which are connected to an auxiliary storage device through a bus. The auxiliary storage device may be a hard disk, flexible disk, MO (Magneto Optical disk), or CD-ROM.

A computer program for implementing the present embodiment is stored in the auxiliary storage, which is read by the CPU into the main memory, and executed by the CPU to implement the mapping logic generator 14, the log logic generator 15, and the logic skeleton composer 18.

The mapping definition storage 11, the process definition storage 12, the skeleton storage 13, the mapping logic storage 16, the log logic storage 17, and the source code storage 19 may be implemented by an auxiliary storage device or the main memory.

Input devices such as a keyboard and a pointing device and output devices such as a display may also be connected to the event converter generating apparatus 10. The input and output devices may be used to describe a mapping definition and process definition.

Examples of mapping and process definitions will be described with reference to FIGS. 4 and 5.

As shown in FIG. 4, a mapping definition defines an association of a message actually exchanged between process A at company X and external tasks at business partner Y with a process event indicator in process A at company X, for example.

Figure 5:
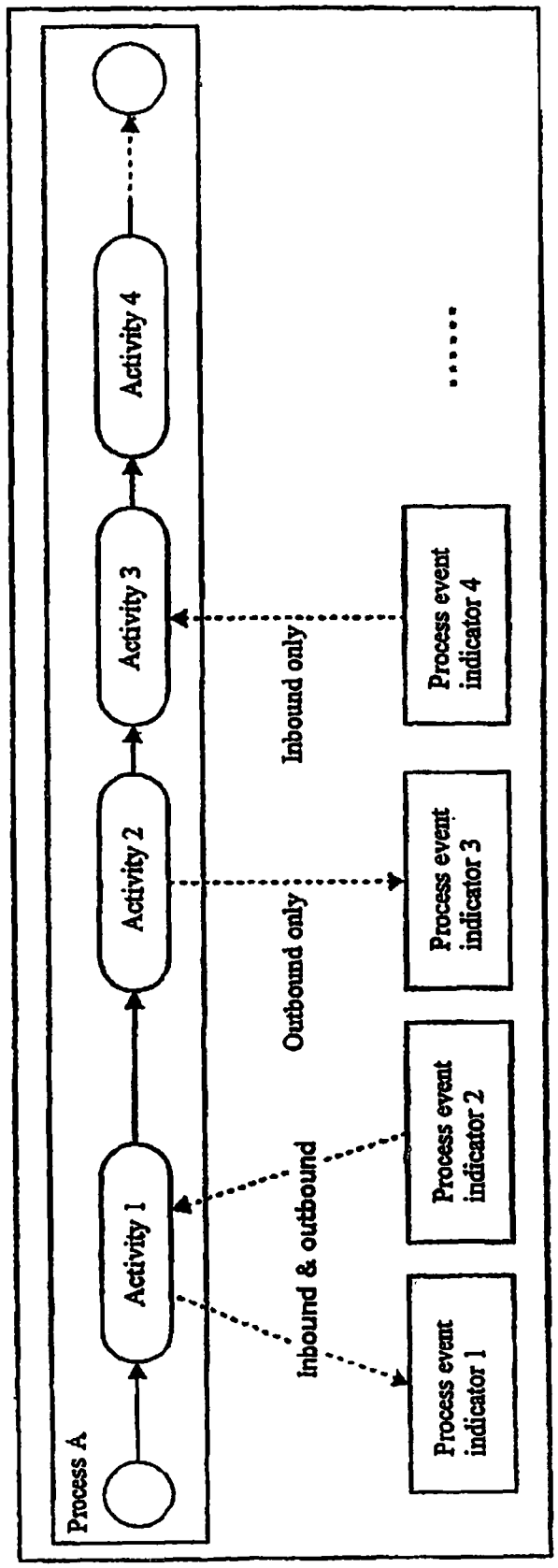
FIG. 5 is a diagram for illustrating a process definition used in the present embodiment.

As shown in FIG. 5, a process definition defines a mapping that indicates which process event indicator is associated with which status of which activity.

In particular, a mapping between a process event indicator and an activity is indicated by a dashed-line arrow. For example, activity 1 is associated with process event indicators 1 and 2, and activities 2 and 3 are associated with process event indicators 3 and 4, respectively.

A mapping between a process event indicator and the status of an activity is indicated by information such as "Inbound & outbound", shown with the broken arrows connecting the process event indicators and activities, and the direction of a dashed-line arrow. In particular, in the case of "Inbound & outbound," an arrow from an activity to a process event indicator indicates the start of the activity and an arrow from a process event indicator to an activity indicates the end of the activity. Therefore, it can be seen that process event indicator 1 indicates the start of activity 1 and process event indicator 2 indicates the end of activity 1. For "Inbound only" and "Outbound only," the start and end of an activity is indicated.

Therefore, it can be seen that process event indicator 3 indicates the start and end of activity 2 and process event indicator 4 indicates the start and end of activity 3.

In FIG. 5, the process definition is schematically shown. In practice, the process definition is represented by a UML activity diagram, for example, that follows the flow of the activities in the process. An UML activity diagram defines inputs and outputs of objects in an activity and does not have semantics for the progress of a process. The essence of the present embodiment is that, considering that events in an activity control flow are embedded in a legacy system and cannot be obtained, outputs and inputs of objects are regarded as events in the activity control flow and an event model is converted.

Operation of the event converter generating apparatus 10 in the present embodiment will be described below.

Figure 6:
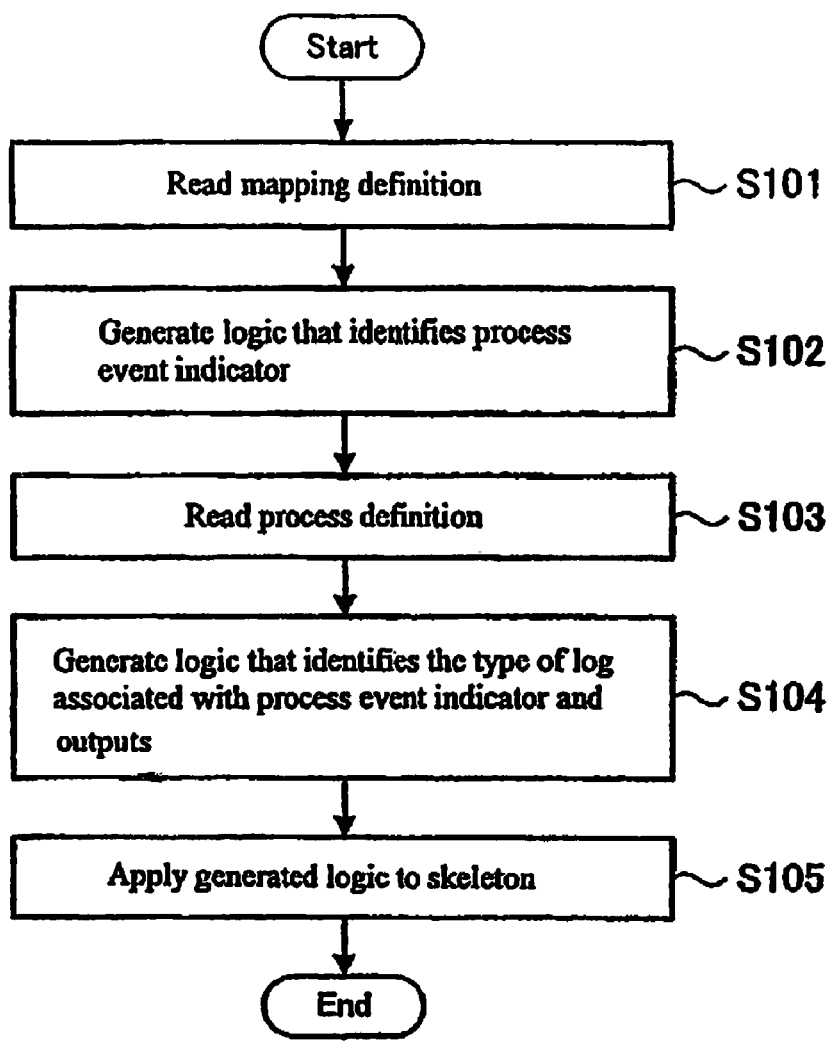
FIG. 6 is a flowchart illustrating an operation performed by an event converter generating apparatus according to the present embodiment.

FIG. 6 is a flowchart indicating an operation performed by the event converter generating apparatus 10 in the present embodiment.

First, the mapping logic generator 14 reads a mapping definition stored in the mapping definition storage 11 (step 101). The mapping logic generator 14 then refers to the mapping definition to generate a mapping logic that identifies a process event indicator and stores it in the mapping logic storage 16 (step 102). For example, in the case of the mapping definition shown in FIG. 4, the mapping logic generator 14 identifies process event indicator 1 in process A in response to detection of message 1, identifies process event indicator 2 in process A in response to detection of message 2, and generates a mapping logic that identifies process event indicator 3 in process A in response to detection of message 3.

The log logic generator 15 reads a process definition stored in the process definition storage 12 (step 103). It then refers to the process definition to generate a log logic that identifies the type of a log associated with a process event indicator and outputting the log and store the log logic in the log logic storage 17. For example, in the case of the process definition shown in FIG. 5, the log logic generator 15 generates a log logic that outputs a log of the start of activity 1 when process event indicator 1 is identified, a log of the end of activity 1 when process event indicator 2 is identified, a log of the start and end of activity 2 when process event indicator 3 is identified, and a log of the start and end of activity 3 when process event indicator 4 is identified.

Then the logic skeleton composer 18 applies the mapping logic stored in the mapping logic storage 16 and the log logic stored in the log logic storage 17 to a skeleton stored in the skeleton storage 13 to generate the source code of the event converter and stores it in the source code storage 19 (step 105).

Figure 7:
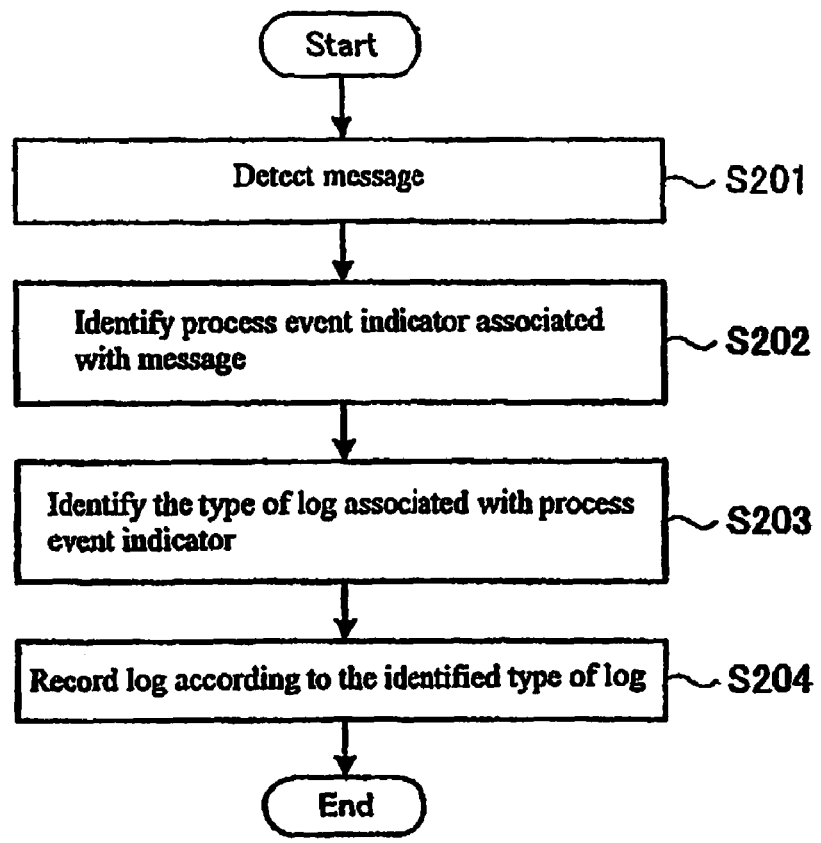
FIG. 7 is a flowchart illustrating an operation performed by an event converter according to the present embodiment.

An event converter provided by compiling a source code thus generated performs an operation as shown in FIG. 7. In particular, a message is detected (step 201), a process event indicator associated with the message is identified (step 202), the type of log corresponding to the process indicator is identified (step 203), and a log is recorded according to the identified log type (step 204).

Figure 8:
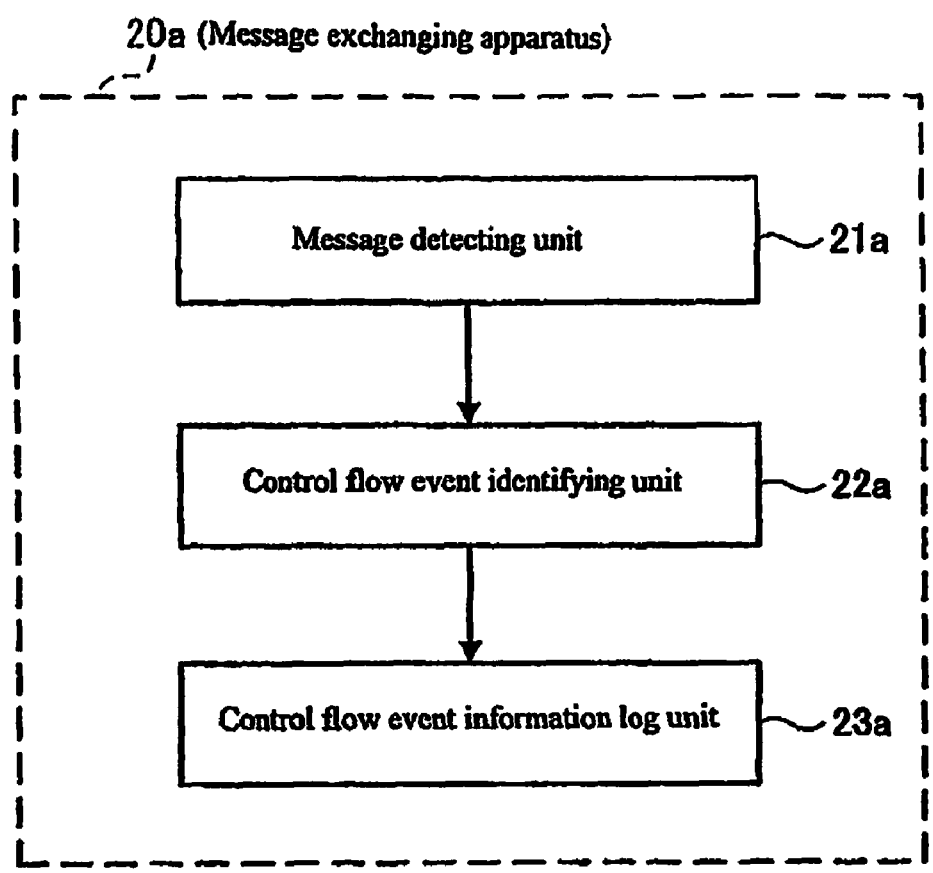
FIG. 8 is a diagram showing a configuration of a message exchanging apparatus in which an event converter is installed according to the present embodiment.

In the present embodiment, the event converter is installed in a message exchanging system. A message exchanging apparatus 20*a* in which the event converter is installed will have a configuration as shown in FIG. 8. The message exchanging apparatus 20*a* includes a message detecting unit 21*a* that detects a message, a control flow event identifying unit 22*a* that identifies a control flow event relating to the detected message, and a control flow event information log unit 23*a* that records information about the identified control flow event as a monitoring log.

Figure 9:
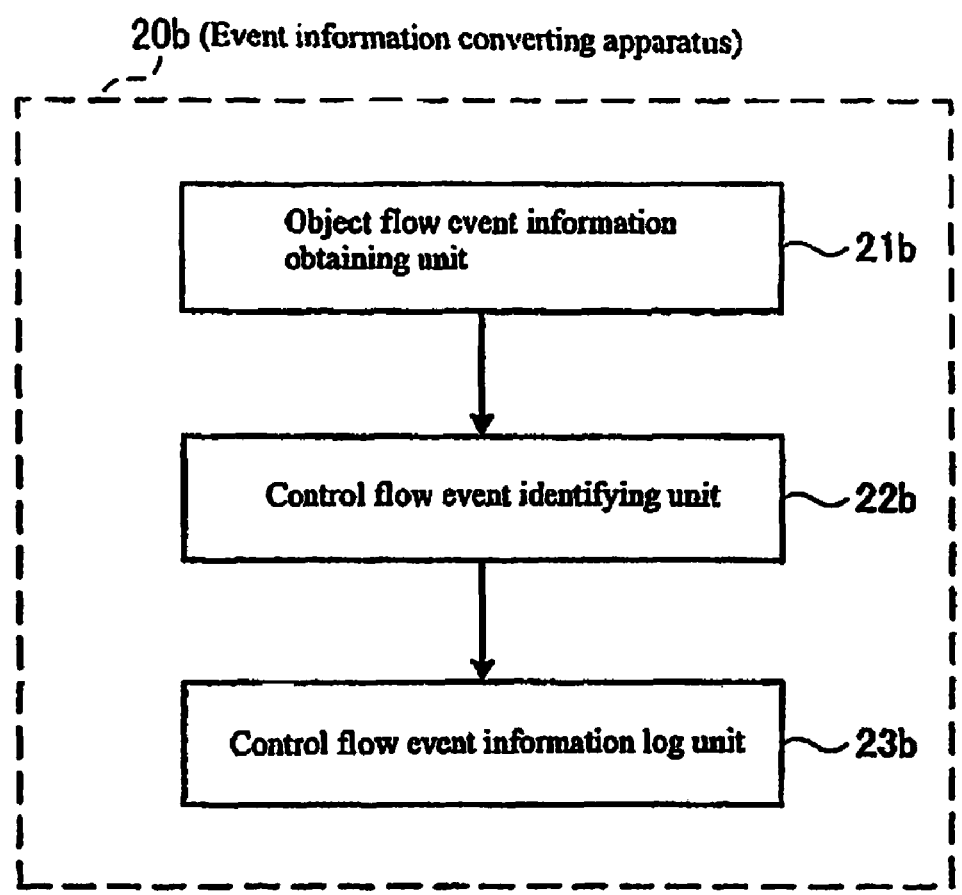
FIG. 9 is a diagram of a configuration of an event information exchanging apparatus in which an event converter is installed according to the present invention.

Alternatively, the event converter may be installed in an apparatus separate from a message exchanging system. In that case, an event information converting apparatus 20*b* with an event convert installed therein will have a configuration as shown in FIG. 9. The event information exchanging apparatus 20*b* includes an object flow event information obtaining unit 21*b* that obtains information about an object flow event from a source such as a message exchanging apparatus, a control flow event identifying unit 22*b* that identifies a control flow event relating to the object flow event the information about which has been obtained, and a control flow event information log unit 23*b* that records information about the identified control flow event as a monitoring log.

This concludes the description of the present embodiment.

While the event converter generator automatically generates an event converter with reference to a mapping definition and a process definition in the embodiment described above, the event converter, instead of the event converter generator, may refer to the mapping definition and process definition during runtime.

In that case, a message exchanging apparatus 20*a* in which the event converter is installed operates as follows. First, a message detector 21*a* detects a message exchanged between a process and an external task. Then, a control flow event identifying unit 22*a* reads a mapping definition stored in a mapping definition storage 11 and refers to the mapping definition to identify a control flow event relating to the detected message. Finally, a control flow event information log unit 23*a* reads a process definition stored in a process definition storage 12 and refers to the process definition to identify and records log information about the identified control flow event.

The event information exchanging apparatus 20*b* on which an event converter is installed operates as follows. First, an object flow event information obtaining unit 21*b* obtains information about an object flow event from a source such as a message exchanging apparatus. Then, the control flow event identifying unit 22*b* reads a mapping definition stored in the mapping definition storage 11 and, with reference to the mapping definition, identifies a control flow event relating to the obtained object flow event. Finally, the control flow event information log unit 23*b* reads a process definition stored in the process definition storage 12 and refers to the process definition to identify and records log information about the identified control flow event.

As has been described above, attention in the present embodiment is focused on an object flow event that is an event in a flow of information generated by executing a process that is a workflow. The object flow event is converted into information about a control flow event that is an event in the workflow. Thus, monitoring the progress of an implicit process can be enabled without having to modify an existing application. Therefore, the progress of an activity such as an activity in a settlement process at a financial institution that is highly dependent on an external task can be viewed through a combined use of the present embodiment and an existing packaged monitoring product.

What is claimed is:

1. A program product, the program product comprising:
   non-transitory computer readable media; and
   a converting mechanism stored on the non-transitory computer readable media, the converting mechanism being applied to a business process integration system, the business process integration system being equipped with first and second information processing systems and a message switching system, the business process integration system exchanging a plurality of messages between the first and the second information processing systems through the message switching system in the performance of an implicit business process, said implicit business process being a process which is performed by at least one legacy application not managed by a workflow system, each message of said plurality of messages exchanged between the first and second information processing systems through the message switching system being generated by said at least one legacy application to perform a function in relation to a respective task in said implicit business process;

wherein said converting mechanism monitors execution of said implicit business process for occurrences of messages of said plurality of messages, said converting mechanism monitoring execution by a process separate from said at least one legacy application and without modification to said at least one legacy application, and responsive to each occurrence of a message of said plurality of messages detected by monitoring execution of said implicit business process, generates a respective event in a progress model of said implicit business process, the respective event being of a type associated with the message said converting mechanism generating a respective event in a progress model of said implicit business process a process separate from said at least one legacy application and without modification to said at least one legacy application; and a judging mechanism also stored on the non-transitory computer readable media, the judging mechanism being used for judging the progress of the business process based on said events generated in said progress model.

2. The program product according to claim 1, further comprising an acquiring part for acquiring a message from the message switching system.

3. The program product according to claim 1, further comprising a recording part for recording the progress of the implicit business process.

4. The program product according to claim 3, wherein the recording part records the progress of the implicit business process as a log.

5. The program product according to claim 1, wherein the implicit business process includes one or more operating units processed by the first information processing system and wherein the judging mechanism judges the progress of the operating unit based on said events generated in said progress model.

6. The program product according to claim 5, wherein the judging mechanism judges a start and/or an end of the operating unit based on said events generated in said progress model.

7. The program product according to claim 6, wherein the operating unit includes, at least in part, an activity performed by an individual.

8. The program product according to claim 1, wherein the implicit business process includes two or more operating units processed by the first information processing system.

9. The program product according to claim 1, wherein the implicit business process includes an operating unit processed with a certain application in the first information processing system, the application not having a progress monitoring function.

10. The program product according to claim 1, wherein the implicit business process includes two or more operating units; some operating units are processed by the first information processing system, and other operating units are processed by the second information processing system.

11. The program product according to claim 1, further comprising a mapping definition that associates each message with a respective control flow event in said progress model.

* * * * *